(12) United States Patent
Uldridge et al.

(10) Patent No.: US 10,680,803 B2
(45) Date of Patent: *Jun. 9, 2020

(54) METHOD AND SYSTEM FOR VERIFYING A RECORDING

(71) Applicant: FTR Labs Pty Ltd, Brisbane, Queensland (AU)

(72) Inventors: Marc Jonathan Uldridge, Brisbane (AU); Anthony Douglass, Brisbane (AU)

(73) Assignee: FTR Labs Pty Ltd, Brisbane (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,022

(22) Filed: Oct. 23, 2019

(65) Prior Publication Data

US 2020/0059355 A1 Feb. 20, 2020

Related U.S. Application Data

(63) Continuation of application No. 16/126,198, filed on Sep. 10, 2018, now Pat. No. 10,476,666.

(30) Foreign Application Priority Data

Sep. 8, 2017 (AU) .................. 2017903658

(51) Int. Cl.
*G06F 21/64* (2013.01)
*H04L 9/06* (2006.01)
(Continued)

(52) U.S. Cl.
CPC .......... *H04L 9/0637* (2013.01); *G06F 21/602* (2013.01); *G06F 21/64* (2013.01);
(Continued)

(58) Field of Classification Search
CPC .... G06F 21/645; H04L 63/123; H04L 9/0637
See application file for complete search history.

(56) References Cited

U.S. PATENT DOCUMENTS 7,861,088 B1 12/2010 Brothers
9,679,276 B1 6/2017 Cuende
(Continued)

OTHER PUBLICATIONS

International-Type Search Report from the Australian Patent Office dated May 31, 2018 for corresponding Australian Application No. 2017903658.
(Continued)

*Primary Examiner* — David J Pearson
(74) *Attorney, Agent, or Firm* — Walter | Haverfield LLP; Sean F. Mellino; D. Peter Hochberg

(57) ABSTRACT

A system for verifying a recording. The system comprises at least one processor, at least one non-transitory computer readable storage medium storing instructions thereon that, when executed by the at least one processor, cause the system to verify an electronic recording file comprising a cryptographic hash function based on the recording and generated by a first electronic device, verifying the electronic recording file comprises generating a pair of certification requests. A first of the pair of certification requests is based on the cryptographic hash function, and a second of the pair of certification requests is based on the cryptographic hash function in combination with one or more further pieces of data associated with the recording. The one or more further pieces of data comprise metadata associated with the recording and/or the first electronic device, sending the pair of certification requests to a blockchain, and receiving confirmation of the approval of the pair of certification requests by the blockchain.

20 Claims, 5 Drawing Sheets

(51) Int. Cl.
  H04L 9/32     (2006.01)
  H04L 29/06    (2006.01)
  G06F 21/60    (2013.01)
  H04N 9/79     (2006.01)

(52) U.S. Cl.
  CPC .......... *G06F 21/645* (2013.01); *H04L 9/0643* (2013.01); *H04L 9/3239* (2013.01); *H04L 9/3263* (2013.01); *H04L 63/123* (2013.01); H04L 2209/38 (2013.01); *H04N 9/79* (2013.01)

(56) References Cited

U.S. PATENT DOCUMENTS

| | | |
|---|---|---|
| 2002/0133513 A1 | 9/2002 | Townsend et al. |
| 2013/0142330 A1 | 6/2013 | Schultz |
| 2016/0283920 A1 | 9/2016 | Fisher et al. |
| 2016/0371509 A1 | 12/2016 | Unitt |
| 2017/0134162 A1 | 5/2017 | Code et al. |
| 2017/0206523 A1 | 7/2017 | Goeringer et al. |
| 2017/0221029 A1 | 8/2017 | Lund et al. |
| 2017/0351660 A1 | 12/2017 | Warstler |
| 2018/0121635 A1 | 5/2018 | Tormasov et al. |
| 2018/0260888 A1 | 9/2018 | Paolini-Subramanya et al. |
| 2018/0337787 A1 | 11/2018 | Uhr et al. |
| 2019/0171849 A1 | 6/2019 | Assenmacher |

OTHER PUBLICATIONS

Billstrom, Adam Hemlin et al., "Video Integrity through Blockchain Technology", Master's Thesis, KTH Royal Institute of Technology, School of Information and Communication Technology (ICT), Department of Communication Systems, Aug. 2, 2017.
Examination Report No. 1 from the Australian Patent Office dated Oct. 12, 2018 for corresponding Australian Patent Application No. 2018226448.
Extended European Search Report from the European Patent Office dated Oct. 19, 2018 for corresponding European Patent Application No. 18193012.4.
International Search Report from the ISA/AU dated Oct. 15, 2018 for related International Application No. PCT/AU2018/000167.
Written Opinion from the ISA/AU dated Oct. 15, 2018 for related International Application No. PCT/AU2018/000167.
Examination Report No. 2 from the Australian Patent Office dated Jul. 25, 2019 for corresponding Australian Patent Application No. 2018226448.
Trusted timestamping, Wikipedia, Mar. 12, 2017, URL: https://en.wikipedia.org/w/index.php?title=Trusted_timestamping&oldid=769943388.
http://fileinfo.com/extension/trm Retrieved using web.archive.org from Oct. 24, 2016.

METHOD AND SYSTEM FOR VERIFYING A RECORDING

CROSS REFERENCE TO RELATED APPLICATIONS

This application is a continuation of co-pending U.S. application Ser. No. 16/126,198 filed on Sep. 10, 2018, and which claims foreign priority based on Australian (AU) Patent Application Serial No. 2017903658 filed on Sep. 8, 2017, the contents of all of which are incorporated herein by reference in their entireties.

TECHNICAL FIELD

The present invention relates to a method and system for verifying a recording. In particular, the present invention relates to a method and system for verifying the authenticity of a recording without disclosing the contents of the recording.

BACKGROUND ART

In legal and legal-related proceedings, maintaining the integrity of the record is a crucial job. For instance, the testimony of a witness or the statements of an accused, if not properly preserved, can lead a judge or jury to make a wrong decision.

Typically, audio and/or video recordings are made during court hearings, and the electronic file of these recordings becomes the official record of the proceedings. From time to time, a party in a proceeding before a court may assert that the recording in the electronic file does not align with their recollection of events, and has therefore been altered or tampered with.

While the likelihood of a successful, undiscovered alteration of an electronic file of this type is relatively low, the making of such an allegation may have serious ramifications both for the custodian of the recording and the proceedings of the court.

As a result, there would be an advantage if it were possible to provide a reliable way in which to independently verify that the electronic file contains an accurate and unaltered recording of the court proceedings.

It will be clearly understood that, if a prior art publication is referred to herein, this reference does not constitute an admission that the publication forms part of the common general knowledge in the art in Australia or in any other country.

SUMMARY OF INVENTION

The present invention is directed to method and system for verifying a recording which may at least partially overcome at least one of the abovementioned disadvantages or provide the consumer with a useful or commercial choice.

With the foregoing in view, the present invention in one form, resides broadly in a method for verifying a recording comprising the steps of:
a) Creating the recording using a first electronic device;
b) Generating, using the first electronic device, an electronic recording file, the electronic recording file comprising information based on the recording and one or more further pieces of data associated with the recording;
c) Sending, using the first electronic device, the electronic recording file to a certification server;
d) Generating, using the certification server, one or more certification requests based on at least a portion of the information in the electronic recording file, and sending the one or more certification requests to a blockchain;
e) Receiving, with the certification server, confirmation of the approval of the one or more certification requests by the blockchain; and
f) Generating and/or displaying a verification confirmation on the first electronic device.

The first electronic device may be of any suitable form. For instance, the first electronic device may be a computer, mobile telephone, tablet or the like. The recording may be made using any suitable technique. However, in a preferred embodiment of the invention, the recording may be made using a software program provided on the first electronic device, an electronic application downloaded to the first electronic device and so on.

Any suitable form of recording may be made. For instance, the recording may be an audio recording, a video recording or both an audio and video recording.

The recording may be a recording of anything capable of being recorded. However, it is envisaged that the method may be more usually used to record an activity where it would be advantageous or desirable to ensure that the recording is an accurate recording of the activity. For instance, the recording may be of a speech or lecture, a political activity (such as a council or parliamentary session or the like), a scientific experiment and so on. More preferably, however, the recording may be a recording of a legal or legal-related proceeding, such as a police interview, court hearing (or a hearing before a similar judicial body), a deposition, a hearing before a disciplinary tribunal or administrative body and the like, or any suitable combination thereof.

It is envisaged that the recording may comprise a recording of the entire proceeding (speech, lecture, political activity, interview, court hearing, deposition and so on), or the recording may comprise a portion of the overall proceeding (for instance, a session or a day of a court case and the like).

In other embodiments of the invention, the recording may comprise a relatively short part of the overall proceeding. In this embodiment, it is envisaged that a recording containing a relatively short part of the overall proceeding may be verified while the proceeding is ongoing. This may be particularly advantageous for long proceedings (such as court hearings, police interviews and the like) where, instead of waiting until the completion of the proceeding to verify the recording, portions of the proceeding may be periodically verified while the proceeding continues. This may be beneficial in that it may reduce the period of time between the recording being created and its verification, reducing the likelihood of the recording being tampered with.

The recording may comprise any suitable portion of the proceeding. For instance, the recording may comprise a portion of the proceeding in which a particular speaker was speaking, or in which a particular topic was being discussed. In other embodiments, the proceeding may be divided into multiple recordings based on time intervals, such that each proceeding comprises a plurality of recordings. In other words, a recording may comprise a period of time shorter than the total length of the proceeding.

The recording may be of any suitable length, and it is envisaged that recordings of the same proceeding may be of different lengths, or may all be of the same length. The length of the recording is not critical, although it is preferable that the recording is relatively short so that the likelihood of the recording being tampered with between being recorded and verified is reduced or minimised. Thus, it is envisaged that the length of the recording may be no more than one hour. More preferably, the length of the recording may be no more than 30 minutes. Yet more preferably, the length of the recording may be no more than 15 minutes. Even more preferably, the length of the recording may be no more than 10 minutes. Most preferably, the length of the recording may be no more than 5 minutes.

It is envisaged that the length of the recording may be predetermined, such that recordings are created at predetermined time intervals. Thus, in this embodiment, the first electronic device may be adapted to create a recording at every predetermined time interval, even though the proceeding may be continuing. Preferably the verification of the recording occurs immediately upon, or soon after, the creation of the recording, so that the time between the creation of the recording and its verification is minimised.

In embodiments of the invention in which the recording is of a legal or legal-related proceeding, it is envisaged that the first electronic device may comprise a computer located in the location where the proceeding is being held (such as a courtroom or the like). Preferably, the computer is provided with recording software in order to create the recording. Any suitable recording software may be provided, although in a preferred embodiment of the invention, the software may create a digital recording.

In a preferred embodiment of the invention, the recording may be stored in the memory of the first electronic device. The recording may be stored in any suitable electronic format. Alternatively, the recording may not be stored in the memory of the first electronic device, and may instead be sent to another electronic device (such as the certification server) for storage. In this embodiment of the invention, the recording may be sent continuously during the creation of the recording, or may be sent at the conclusion of the recording. In another embodiment of the invention, the recording may be stored on a storage medium, such as a disc, external hard drive, flash drive or the like, or a combination thereof.

The recording may be stored or saved in any suitable format. More specifically, the recording may be stored or saved in any suitable file format. For instance, the recording may be stored or saved as one or more of the following file types: AVI, ASF, MOV, QT, AVCHD, FLV, SWF, MPG, MP3, MP4, WMV, H.264, DivX, WAV, OGG, GSM, DCT, FLAC, AU, AIFF, VOX, RAW, WMA, AAC, ATRAC, RA, DSS, MSV or DVF. In a specific embodiment of the invention, the recording may be saved or stored as a TRM file.

As previously stated, an electronic recording file is generated by the first electronic device, the electronic recording file being based on the recording and one or more further pieces of data associated with the recording.

It is envisaged that, in some embodiments of the invention, the electronic recording file may include the recording. More preferably, however, the electronic recording file may be based on the recording, but may not comprise the recording itself. In this embodiment of the invention, the electronic recording file may be based on any suitable information based on the recording. For instance, the electronic recording file may comprise a hash function based on the recording. More preferably, the electronic recording file may comprise a cryptographic hash function based on the recording.

In a specific embodiment of the invention, the electronic recording file may comprise a cryptographic hash function from the SHA-2 set of cryptographic hash functions. In particular, the electronic recording file may comprise an SHA-256 hash of the recording.

The one or more further pieces of data associated with the recording may be of any suitable form. Preferably, however, the one or more further pieces of data may comprise metadata associated with the recording, the first electronic device and so on. It is envisaged that the one or more further pieces of data may include one or more of the file name of the recording, the first electronic device serial number, the serial number of the motherboard of the first electronic device, information regarding the network card of the first electronic device (such as the MAC address, the IP address and so on), the details of any users of the first electronic device (such as the names of the users, the times and dates that users logged in and/or out of the first electronic device and/or the recording software), the date and time at which the recording was made, the geographic location at which the recording was made, the matter or proceeding to which the recording relates and so on.

The electronic recording file may be sent to the certification server using any suitable technique. For instance, the electronic recording file may be sent in the form of an email, SMS message, MMS message or the like. More preferably, however, the electronic recording file may be sent to the certification server as a machine-readable electronic message. In another embodiment of the invention, the electronic recording file may be sent to the certification server via one or more application programming interfaces (APIs). The electronic recording file is preferably sent electronically, for instance using a Wi-Fi connection, Bluetooth connection or the like, or a combination thereof.

It is envisaged that the electronic recording file may be sent to an API running on the certification server, or may be running on a second electronic device (such as a computer, mobile telephone, tablet compute or the like) in electronic communication with the certification server.

In embodiments of the invention in which the electronic recording file is in machine-readable format, it is envisaged that the certification server and/or the API associated with the certification server may automatically generate the one or more certification requests in response to receiving the electronic recording file. In some embodiments of the invention, the certification server may also save or store the electronic recording file. The electronic recording file may be saved or stored in electronic memory associated with the certification server (such as a hard drive or the like), remote memory (such as Cloud memory), or on a storage medium, such as a disc, external hard drive, flash drive or the like, or a combination thereof.

As previously stated, the one or more certification requests are based on at least a portion of the information in the electronic recording file. For instance, a certification request may be based on the recording, a hash function based on the recording, a cryptographic hash function based on the recording, at least one or the one or more further pieces of data associated with the recording, or any suitable combination thereof.

In a preferred embodiment of the invention, a plurality of certification requests may be generated by the certification server (or, in some embodiments, an API associated with the certification server). In this embodiment of the invention, it is envisaged that, while each of the certification requests may contain some information that is common to other certification requests, no certification request is identical to another certification request. For instance, in a specific embodiment of the invention, a pair of certification requests may be generated. A first certification request may be based on a cryptographic hash function based on the recording, while a second certification request may be based on a cryptographic hash function based on the recording in combination with the one or more further pieces of information associated with the recording.

The one or more certification requests may be sent to the blockchain in any suitable form. Preferably, however, the one or more certification requests are sent to the blockchain in machine-readable form. The one or more certification requests are preferably sent electronically, for instance using a Wi-Fi connection, Bluetooth connection or the like, or a combination thereof. Preferably, the action of sending the one or more certification requests to the blockchain involves initiating the creation of one or more new records on the blockchain. Preferably, a hash function (or a cryptographic hash function) of the contents of each of the one or more certification requests is written to the blockchain. Preferably, a timestamp provided by the blockchain is also recorded. The one or more certification requests may form a portion of a blockchain (such as one or more blocks within a blockchain, or a portion of a block within a blockchain).

Any suitable blockchain may be used. However, in a preferred embodiment of the invention, the blockchain may be a public blockchain, or an open source blockchain. In a specific embodiment of the invention, the blockchain may be the Hyperledger blockchain hosted by the Linux Foundation.

If the one or more certification requests are successfully written to the blockchain, the blockchain may send a confirmation notification confirming this to the confirmation server (or the API associated with the confirmation server). Alternatively, the confirmation server (or the API associated with the confirmation server) may continuously or periodically query the blockchain to determine whether the one or more certification requests have been successfully written to the blockchain. Confirmation of the writing of the certification requests to the blockchain may be received in any suitable form. However, in a preferred embodiment of the invention, the confirmation of the writing of the certification requests to the blockchain may be in the form of blockchain record information.

In either event, once the confirmation server (or the API associated with the confirmation server) receives confirmation of the approval of the one or more certification requests (i.e. that the one or more certification requests have been written to the blockchain), the confirmation (for instance, in the form of the blockchain record information) may be saved or stored in electronic memory associated with the certification server (such as a hard drive or the like), remote memory (such as Cloud memory), or on a storage medium, such as a disc, external hard drive, flash drive or the like, or a combination thereof.

As previously stated, once confirmation of the approval of the one or more certification requests is received, a verification confirmation is generated and/or displayed on the first electronic device. In some embodiments of the invention, the confirmation server (or the API associated with the confirmation server) may generate the verification confirmation and send it to the first electronic device. In these embodiments of the invention, the verification confirmation may be sent in any suitable form, such as an email, SMS message, MMS message or the like. More preferably, however, the verification confirmation may be sent to the certification server as a machine-readable electronic message. The verification confirmation is preferably sent electronically, for instance using a Wi-Fi connection, Bluetooth connection or the like, or a combination thereof.

It is envisaged that, upon receipt of the verification confirmation, the first electronic device (or the recording software associated with the first electronic device) may record the verification confirmation against the recording and/or the electronic recording file. The verification confirmation may be recorded electronically against the recording and/or the electronic recording file. Alternatively, the verification confirmation may be recorded electronically against the recording and/or the electronic recording file and the verification confirmation (or a notification confirming receipt of the verification confirmation) may be displayed on the first electronic device (or in the recording software associated with the first electronic device). The notification may be of any suitable form, such as a pop-up notification for a user, an audible or visual signal, a certificate or notice displayed on the first electronic device or the like. Alternatively, the notification may be displayed within the recording software, for instance in the form of text, symbols, or through a visual cue such as a change in the colour, size etc. of text within the recording software.

In an alternative embodiment of the invention, the confirmation server may send the confirmation of the approval of the one or more certification requests (for instance, in the form of the blockchain record information) to the first electronic device. In this embodiment of the invention, it is envisaged that, upon receipt of the confirmation of the approval of the one or more certification requests, the first electronic device (or the recording software associated with the first electronic device) may generate and/or display the verification confirmation.

Once generated, the verification confirmation may be recorded and/or displayed in the same manner as described previously.

In some embodiments of the invention, the first electronic device may be adapted to generate both the electronic recording file and the one or more certification requests based on at least a portion of the information in the electronic recording file. In these embodiments of the invention, the first electronic device may be adapted to send the one or more certification requests to a blockchain. Thus, in a further aspect, the invention resides broadly in a method for verifying a recording comprising the steps of:
- a) Creating the recording using a first electronic device;
- b) Generating, using the first electronic device, an electronic recording file, the electronic recording file comprising information based on the recording and one or more further pieces of data associated with the recording;
- c) Generating, using the first electronic device, one or more certification requests based on at least a portion of the information in the electronic recording file, and sending the one or more certification requests to a blockchain;
- d) Receiving, with the first electronic device, confirmation of the approval of the one or more certification requests by the blockchain; and
- e) Generating and/or displaying a verification confirmation on the first electronic device.

In another aspect, the invention resides broadly in a method of confirming a verification of a recording by a blockchain, the method comprising the steps of:
- a) Retrieving a recording from electronic memory associated with a first electronic device;
- b) Generating, using the first electronic device, an electronic recording file, the electronic recording file comprising information based on the recording and, optionally, one or more further pieces of data associated with the recording;

c) Sending, using the first electronic device, the electronic recording file to a certification server;

d) Retrieving, from electronic memory associated with the certification server, blockchain record details associated with the electronic recording file;

e) Sending, using the certification server, the blockchain record details to the first electronic device;

f) Generating and/or displaying a verification confirmation associated with the blockchain record details on the first electronic device; and g) Optionally verifying the electronic recording file with a blockchain that generated the blockchain record details.

In some embodiments of the invention, the electronic recording file comprises information based on the recording and one or more further pieces of data associated with the recording.

In some embodiments of the invention, the first electronic device may be adapted to generate the electronic recording file and the one or more certification requests based on at least a portion of the information in the electronic recording file. The first electronic device may also be adapted to retrieive, from electronic memory associated with the first electronic device, blockchain record details associated with the electronic recording file. In these embodiments of the invention, the first electronic device may be adapted to send the one or more certification requests to a blockchain. Thus, in yet another aspect, the invention resides broadly in a method of confirming a verification of a recording by a blockchain, the method comprising the steps of:

a) Retrieving a recording from electronic memory associated with a first electronic device;

b) Generating, using the first electronic device, an electronic recording file, the electronic recording file comprising information based on the recording and, optionally, one or more further pieces of data associated with the recording;

c) Retrieving, from electronic memory associated with the first electronic device, blockchain record details associated with the electronic recording file;

d) Generating and/or displaying a verification confirmation associated with the blockchain record details on the first electronic device; and e) Optionally verifying the electronic recording file with a blockchain that generated the blockchain record details.

In a further aspect, the invention resides broadly in a system for verifying a recording, the system comprising:

at least one processor, at least one non-transitory computer readable storage medium storing instructions thereon that, when executed by the at least one processor, cause the system to:

verify an electronic recording file associated with the recording and generated by a first electronic device, wherein verifying the electronic recording file comprises generating one or more certification requests, sending the one or more certification requests to a blockchain, and receiving confirmation of the approval of the one or more certification requests by the blockchain.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
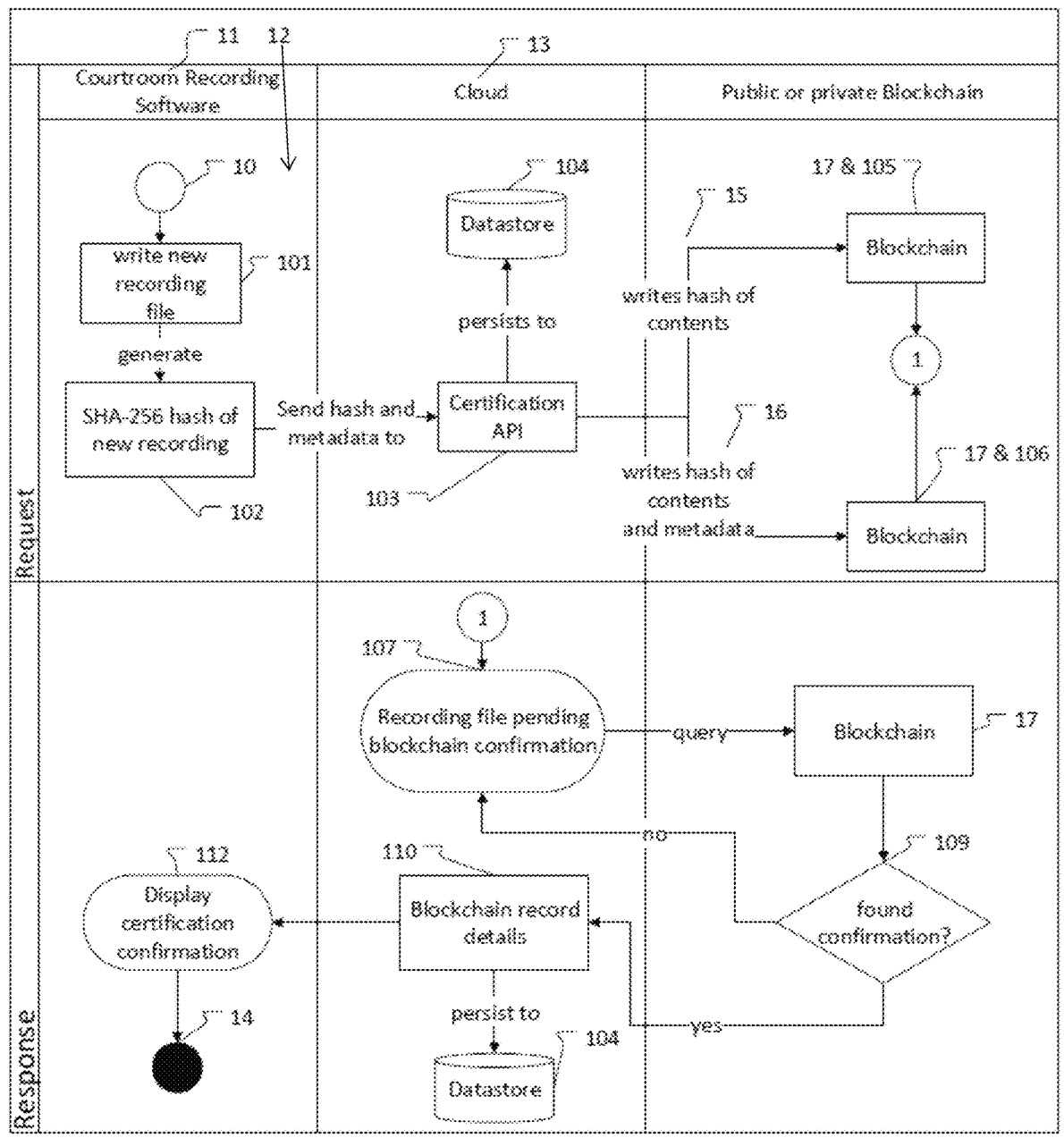
FIG. 1 illustrates a flowchart of a method and system for verifying a recording according to an embodiment of the present invention.

FIG. 1 illustrates a flowchart of a method and system for verifying a recording according to an embodiment of the present invention. In this Figure, a recording 10 is made on recording software 11 running on a first electronic device 12. In this embodiment, the first electronic device 12 is located in a courtroom, and the recording 10 is a video and audio recording of a legal proceeding. The first electronic device 12 in this embodiment is a computer.

The first electronic device 12 stores the recording 10 in the memory of the first electronic device 12 as an electronic file 101. In the embodiment of the invention shown in FIG. 1, the electronic file 101 is a TRM file.

The first electronic device 12 generates, from the electronic file 101, an electronic recording file 102. The electronic recording file 102 is a cryptographic hash of the contents of the electronic file 101, and in particular an SHA-256 hash of the contents of the electronic file 101. In addition, the electronic recording file 102 includes further pieces of data associated with the recording 10. In this embodiment, the further pieces of data include the name of the electronic file 101, the motherboard serial number of the first electronic device, the network card MAC address of the first electronic device 12 and the details of the user logged into the recording software 11 when the recording 10 was made.

The electronic recording file 102 is transmitted electronically to a cloud-based certification server 13. The electronic recording file 102 is received by an API 103 associated with the certification server 13. The API 103 both stores or saves the electronic recording file 102 to memory 104 associated with the certification server 13 and also generates a first certification request 15 and a second certification request 16.

In the embodiment of the invention shown in FIG. 1, the first certification request 15 contains the SHA-256 hash of the contents of the electronic file 101. The second certification request 16 also contains the SHA-256 hash of the contents of the electronic file 101, along with the further pieces of data. Thus, the contents of the second certification request 16 are, in effect, the same as the contents of the electronic recording file 102. Thus, while some of the information in the first certification request 15 and the second certification request 16 is the same, the first certification request 15 and the second certification request 16 are not identical to one another.

The first certification request 15 and the second certification request 16 are transmitted electronically to a blockchain 17. The first certification request 15 is written to the blockchain 17 as a new record 105, while the second certification request 16 is written to the blockchain as a new record 106. Along with the contents of the first certification request and the second certification request 16, respectively, the records 105, 106 also include a timestamp (i.e. a date and time at which the records 105, 106 are written to the blockchain 107) provided by the blockchain 107.

Once the certification requests 15, 16 are written to the blockchain 17, a confirmation service 107 periodically (or continuously, if preferred) queries the blockchain 17 to seek confirmation 109 of whether the records 105, 106 have been successfully written to the blockchain 17. It will be understood that if the records 105, 106 are successfully written to the blockchain 17, then the contents of the records 105, 106 (and therefore the recording 10) are accepted as being correct and unaltered.

If the confirmation service 107 does not receive confirmation of the records 105, 106 being written to the blockchain 17, a further query is sent to the blockchain 17. On the other hand, if confirmation of the successful writing of records 105, 106 to the blockchain 17 is received by the confirmation service 107, the blockchain record details 110 are electronically transmitted to the certification server 13. The blockchain record details 110 are saved or stored in memory 104 associated with the certification server 13 and are also electronically transmitted to the first electronic device 12.

Upon receipt of the blockchain record details 110, the first electronic device 12 (or the recording software 11 associated with the first electronic device 12) generates a verification confirmation 112. The verification confirmation 112 is associated with the recording 10 by the recording software 11. In the embodiment of the invention shown in FIG. 1, the first electronic device 12 also displays the verification confirmation 112 on a display 14 of the first electronic device 12. While it is envisaged that the verification confirmation 112 may be generated automatically by the first electronic device 12 on receipt of the blockchain record details 110, the display of the verification confirmation 112 may be in response to a user query, or may occur automatically once the verification confirmation 112 is received.

Figure 2:
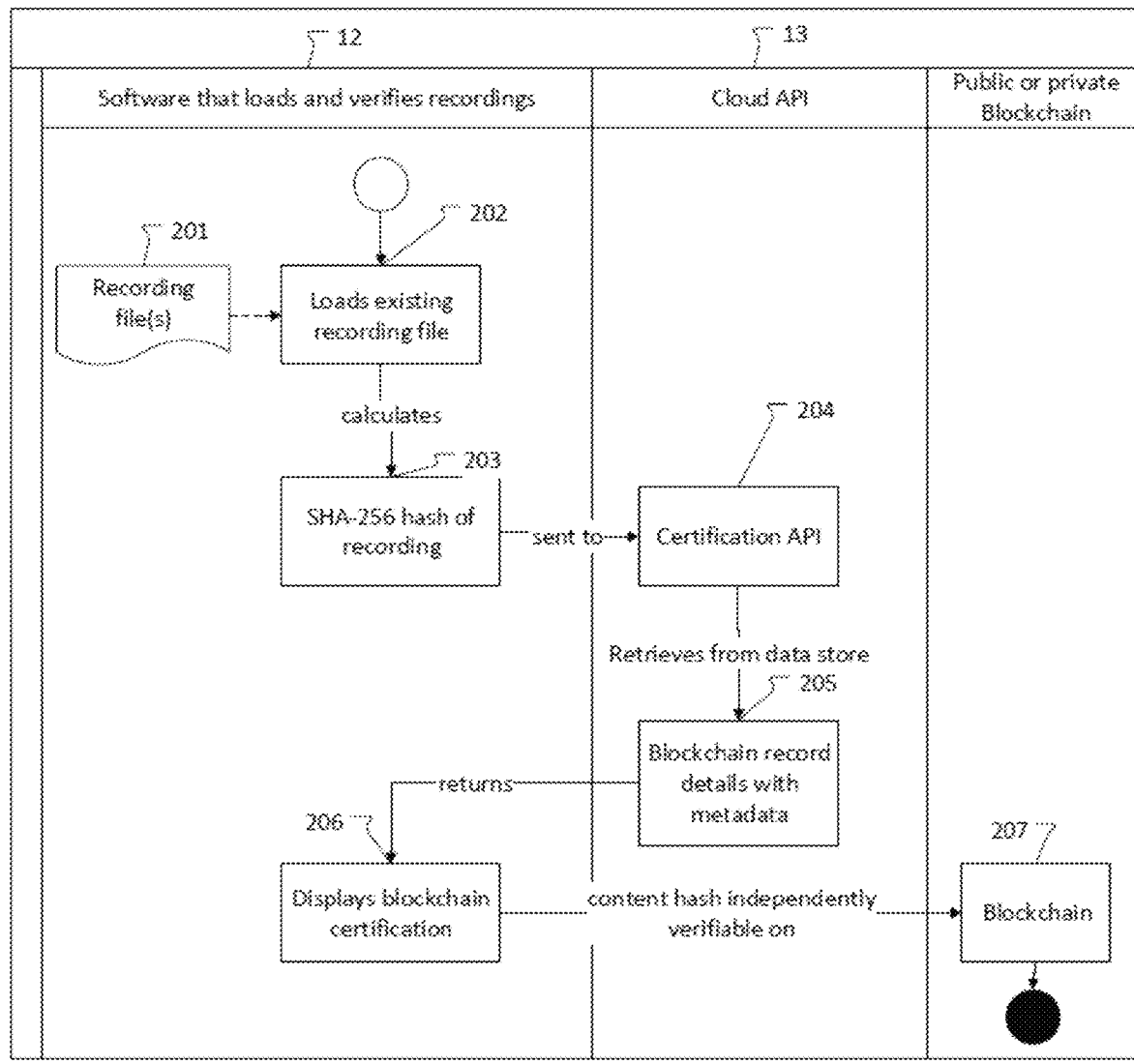
FIG. 2 illustrates a flowchart of a method and system for verifying a recording according to an embodiment of the present invention.

FIG. 2 illustrates a flowchart of a method and system for verifying a recording according to an embodiment of the present invention. More specifically, FIG. 2 illustrates a method for confirming the verification of a recording.

In FIG. 2, a recording file 201 that is saved in the memory of a first electronic device 12 is loaded into playback software 202 running on the first electronic device 12. The first electronic device 12 (and the playback software 202) generates an electronic recording file 203 that is a cryptographic hash of the contents of the recording file 201, and in particular an SHA-256 hash of the contents of the recording file 201. In addition, the electronic recording file 203 includes further pieces of data associated with the recording file 201. In this embodiment, the further pieces of data include the name of the recording file 201.

The electronic recording file 203 is electronically transmitted to a cloud-based certification server 13 and, in particular, a certification API 204 associated with the certification server 13. The certification API 204 retrieves data from memory associated with the certification server 13. In particular, the certification API 204 retrieves the blockchain record details 205 associated with the recording file 201.

The blockchain record details 205 are then electronically transmitted to the first electronic device 12, and a verification confirmation 206 is displayed to a user. If desired, the electronic recording file 203 may be independently verified on the blockchain 207.

Figure 3:
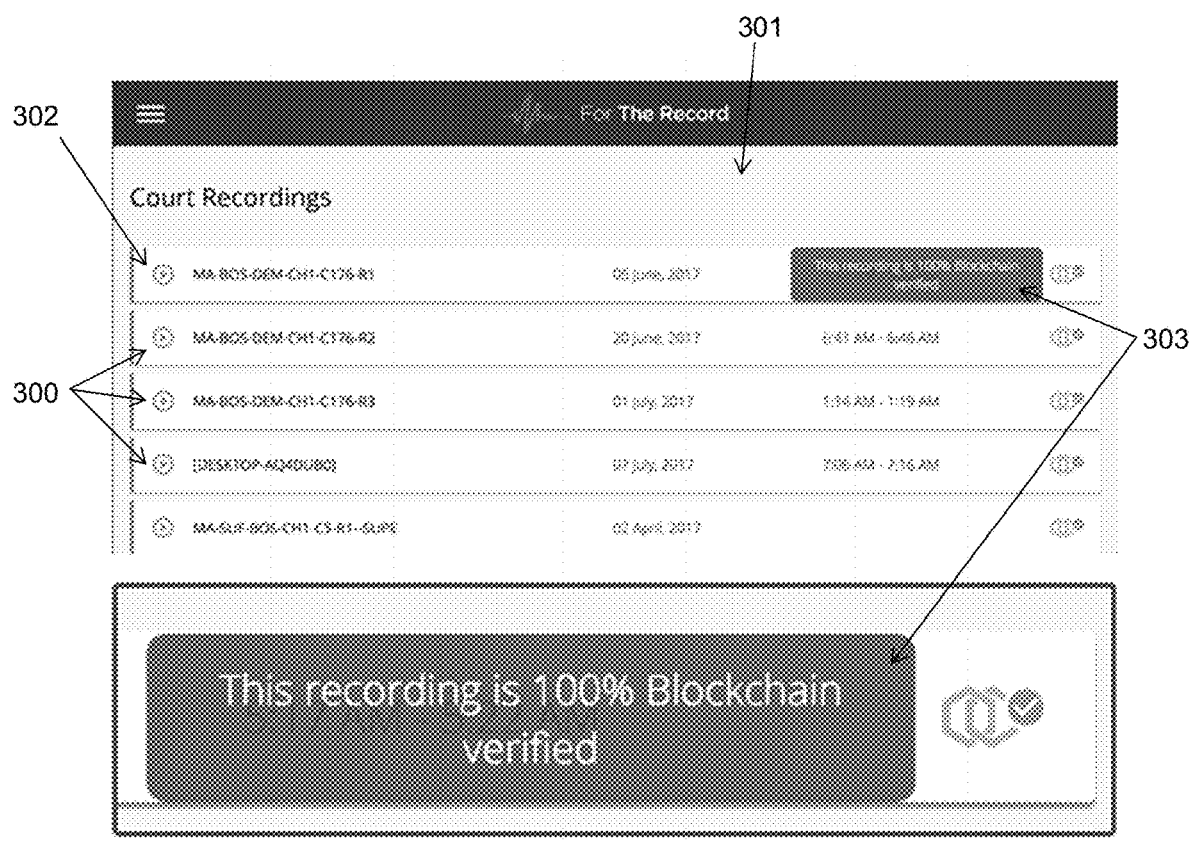
FIG. 3 illustrates a screenshot of a step in a method for verifying a recording according to an embodiment of the present invention.

FIG. 3 illustrates a screenshot of a step in a method for verifying a recording according to an embodiment of the present invention. In this Figure, a plurality of recordings 300 are displayed to a user on an interface 301.

When a verified recording 302 appears in the list, a verification confirmation 303 is displayed on the interface indicating that the recording 302 has been verified by a blockchain. As previously mentioned, this indicates to a user that the recording 302 is a correct and unaltered recording of the, for instance, legal proceeding recorded therein.

Figure 4:
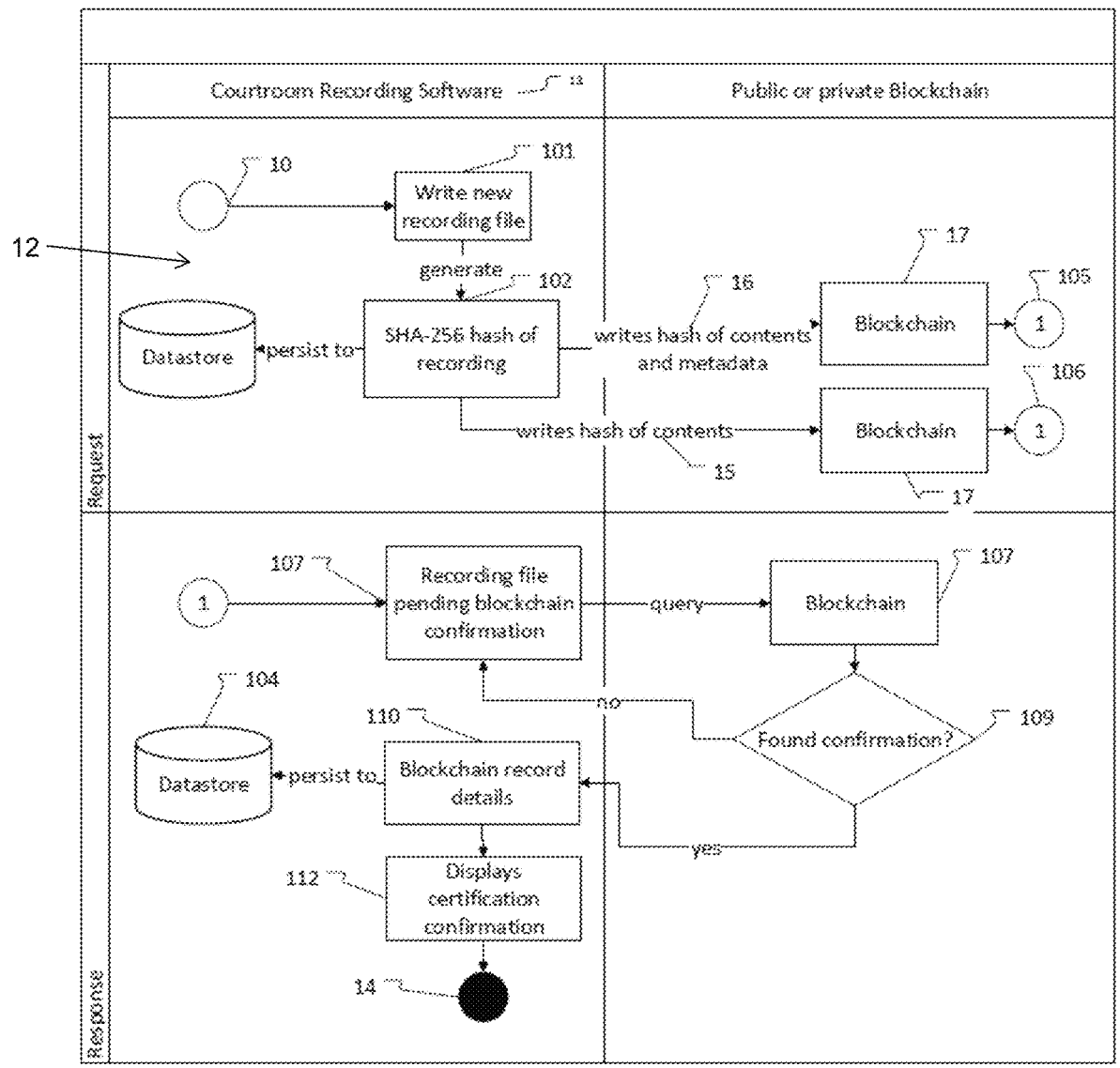
FIG. 4 illustrates a flowchart of a method and system for verifying a recording according to an embodiment of the present invention.

FIG. 4 illustrates a flowchart of a method and system for verifying a recording according to an embodiment of the present invention. In this Figure, a recording 10 is made on recording software 11 running on a first electronic device 12. In this embodiment, the first electronic device 12 is located in a courtroom, and the recording 10 is a video and audio recording of a legal proceeding. The first electronic device 12 in this embodiment is a computer.

The first electronic device 12 stores the recording 10 in the memory of the first electronic device 12 as an electronic file 101. In the embodiment of the invention shown in FIG. 1, the electronic file 101 is a TRM file.

The first electronic device 12 generates, from the electronic file 101, an electronic recording file 102. The electronic recording file 102 is a cryptographic hash of the contents of the electronic file 101, and in particular an SHA-256 hash of the contents of the electronic file 101. In addition, the electronic recording file 102 includes further pieces of data associated with the recording 10. In this embodiment, the further pieces of data include the name of the electronic file 101, the motherboard serial number of the first electronic device, the network card MAC address of the first electronic device 12 and the details of the user logged into the recording software 11 when the recording 10 was made.

Unlike the embodiment of the invention illustrated in FIG. 1, the electronic recording file 102 is not transmitted electronically to a cloud-based certification server. Instead, the first electronic device 12 generates a first certification request 15 and a second certification request 16 and transmits these electronically to a blockchain 17.

In the embodiment of the invention shown in FIG. 4, the first certification request 15 contains the SHA-256 hash of the contents of the electronic file 101. The second certification request 16 also contains the SHA-256 hash of the contents of the electronic file 101, along with the further pieces of data. Thus, the contents of the second certification request 16 are, in effect, the same as the contents of the electronic recording file 102. Thus, while some of the information in the first certification request 15 and the second certification request 16 is the same, the first certification request 15 and the second certification request 16 are not identical to one another.

The first certification request 15 is written to the blockchain 17 as a new record 105, while the second certification request 16 is written to the blockchain as a new record 106. Along with the contents of the first certification request and the second certification request 16, respectively, the records 105, 106 also include a timestamp (i.e. a date and time at which the records 105, 106 are written to the blockchain 107) provided by the blockchain 107.

Once the certification requests 15, 16 are written to the blockchain 17, a confirmation service 107 periodically (or continuously, if preferred) queries the blockchain 17 to seek confirmation 109 of whether the records 105, 106 have been successfully written to the blockchain 17. It will be understood that if the records 105, 106 are successfully written to the blockchain 17, then the contents of the records 105, 106 (and therefore the recording 10) are accepted as being correct and unaltered.

If the confirmation service 107 does not receive confirmation of the records 105, 106 being written to the blockchain 17, a further query is sent to the blockchain 17. On the other hand, if confirmation of the successful writing of records 105, 106 to the blockchain 17 is received by the confirmation service 107, the blockchain record details 110 are electronically transmitted to the first electronic device 12. The blockchain record details 110 are saved or stored in memory 104 associated with the first electronic device 12.

Upon receipt of the blockchain record details 110, the first electronic device 12 (or the recording software 11 associated with the first electronic device 12) generates a verification confirmation 112. The verification confirmation 112 is associated with the recording 10 by the recording software 11. In the embodiment of the invention shown in FIG. 1, the first electronic device 12 also displays the verification confirmation 112 on a display 14 of the first electronic device 12. While it is envisaged that the verification confirmation 112 may be generated automatically by the first electronic device 12 on receipt of the blockchain record details 110, the display of the verification confirmation 112 may be in response to a user query, or may occur automatically once the verification confirmation 112 is received.

Figure 5:
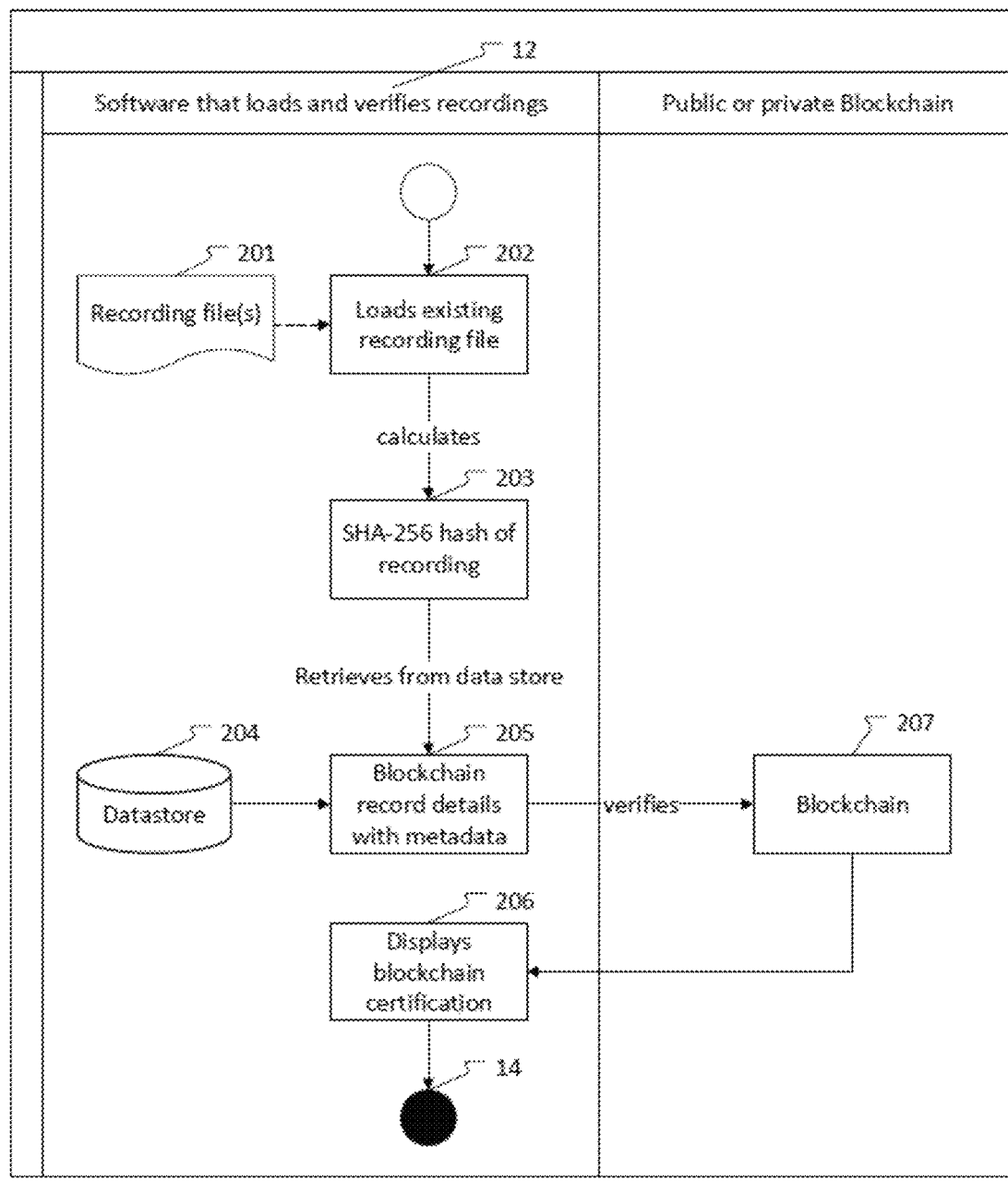
FIG. 5 illustrates a flowchart of a method and system for verifying a recording according to an embodiment of the present invention.

FIG. 5 illustrates a flowchart of a method and system for verifying a recording according to an embodiment of the present invention. More specifically, FIG. 5 illustrates a method for confirming the verification of a recording.

In FIG. 5, a recording file 201 that is saved in the memory of a first electronic device 12 is loaded into playback software 202 running on the first electronic device 12. The first electronic device 12 (and the playback software 202) generates an electronic recording file 203 that is a cryptographic hash of the contents of the recording file 201, and in particular an SHA-256 hash of the contents of the recording file 201. In addition, the electronic recording file 203 includes further pieces of data associated with the recording file 201. In this embodiment, the further pieces of data include the name of the recording file 201.

The first electronic device 12 retrieves, from electronic storage 204 associated with the first electronic device 12, the blockchain record details 205 associated with the recording file 201. The blockchain record details 205 and/or the electronic recording file 203 may be electronically transmitted from the first electronic device 12 to the blockchain 207 for verification. Upon verification by the blockchain 207, a verification confirmation 206 is displayed to a user on a display 14 of the first electronic device 12.

An embodiment of the present invention also comprises a system for verifying a recording, the system comprising:

at least one processor, at least one non-transitory computer readable storage medium storing instructions thereon that, when executed by the at least one processor, cause the system to:

verify an electronic recording file associated with the recording and generated by a first electronic device, wherein verifying the electronic recording file comprises generating one or more certification requests, sending the one or more certification requests to a blockchain, and receiving confirmation of the approval of the one or more certification requests by the blockchain.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A system for verifying a recording, the system comprising:

at least one processor, at least one non-transitory computer readable storage medium storing instructions thereon that, when executed by the at least one processor, cause the system to:

verify an electronic recording file comprising a cryptographic hash function based on the recording and generated by a first electronic device, wherein verifying the electronic recording file comprises generating a pair of certification requests, wherein a first of the pair of certification requests is based on the cryptographic hash function, and a second of the pair of certification requests is based on the cryptographic hash function in combination with one or more further pieces of data associated with the recording, wherein the one or more further pieces of data comprise metadata associated with the recording and/or the first electronic device, sending the pair of certification requests to a blockchain, and receiving confirmation of the approval of the pair of certification requests by the blockchain.

2. A system according to claim 1 wherein the one or more further pieces of data associated with the recording include one or more of the file name of the recording, the first electronic device serial number, the serial number of the motherboard of the first electronic device, information regarding a network card of the first electronic device, details of any users of the first electronic device, date and time at which the recording was made, geographic location at which the recording was made and/or a matter or proceeding to which the recording relates.

3. A system according to claim 1 wherein the pair of certification requests are generated by a certification server.

4. A system according to claim 1 wherein the pair of certification requests are sent to the Blockchain in machine-readable form.

5. A system according to claim 1 wherein the confirmation of the approval of the pair of certification requests by the blockchain is received in the form of blockchain record information.

6. A system according to claim 1 wherein, upon receiving confirmation of the approval of the pair of certification requests by the blockchain the system generates and/or displays a verification confirmation on the first electronic device.

7. A system according to claim 6 wherein the verification confirmation is recorded electronically against the recording and/or the electronic recording file by the first electronic device.

8. A system according to claim 1 wherein the cryptographic hash function comprises an SHA-256 hash of the recording.

9. A system according to claim 1 wherein the recording is stored in the memory of the first electronic device.

10. A system according to claim 1 wherein the first electronic device comprises a computer.

11. A system according to claim 1 wherein the electronic recording file is sent as a machine-readable electronic message to an API running on a certification server or a second electronic device, the second electronic device being in electronic communication with the certification server.

12. A system according to claim 11 wherein the second electronic device comprises a computer, mobile telephone or tablet computer.

13. A system according to claim 11 wherein the electronic recording file is saved or stored in electronic memory associated with the certification server, remote memory or on a storage medium.

14. A system according to claim 1 wherein sending the pair of certification requests to the blockchain initiates the creation of one or more new records on the blockchain.

15. A system according to claim 1 wherein the pair of certification requests form a portion of the blockchain.

16. A system according to claim 1 wherein the confirmation of the approval of the pair of certification requests by the blockchain is received by a confirmation server or an API associated with the confirmation server.

17. A system according to claim 1 wherein the confirmation of the approval of the pair of certification requests by the blockchain is received in the form of blockchain record information.

18. A system according to claim 17 wherein the blockchain record information includes a timestamp provided by the blockchain.

19. A system according to claim 1 wherein, upon receipt of the confirmation of the approval of the pair of certification requests by the blockchain, a verification confirmation is generated and/or displayed on the first electronic device.

20. A system according to claim 19 wherein, upon receipt of the verification confirmation, the first electronic device records the verification confirmation against the recording and/or the electronic recording file.

* * * * *